United States Patent [19]

Nofziger

[11] 4,006,028
[45] Feb. 1, 1977

[54] SEALING GLASS COMPOSITIONS AND PASTES AND USE THEREOF
[75] Inventor: Neil B. Nofziger, Sylvania, Ohio
[73] Assignee: Owens-Illinois, Inc., Toledo, Ohio
[22] Filed: July 3, 1975
[21] Appl. No.: 592,968
[52] U.S. Cl. .............................. 106/47 R; 106/53
[51] Int. Cl.² ...................... C03C 3/12; C03C 3/10
[58] Field of Search ........................... 106/53, 47 R
[56] References Cited
UNITED STATES PATENTS

| | | | |
|---|---|---|---|
| 3,258,350 | 6/1966 | Martin et al. | 106/47 R |
| 3,759,727 | 9/1973 | Deitz et al. | 106/53 |
| 3,778,242 | 12/1973 | Francel et al. | 106/47 R |
| 3,888,686 | 6/1975 | Ellis | 106/53 |
| 3,907,585 | 9/1975 | Francel et al. | 106/53 |

Primary Examiner—Winston A. Douglas
Assistant Examiner—Mark Bell
Attorney, Agent, or Firm—S. M. McLary; E. J. Holler

[57] ABSTRACT

A sealing glass composition comprises a PbO-containing glass frit, two particulate refractory fillers having controlled particle size distributions, and optionally at least one additive to prevent the chemical reduction of the PbO when the frit is fired in the presence of reducing conditions. The sealing glass composition is useful as a package sealant. It is especially useful as a solder glass for sealing a face plate portion to a funnel portion of a color television picture tube at temperatures of about 400° C. A particulate glass composition for use in preparing the sealing glass composition, a sealing glass paste and methods of using the sealing glass and paste are provided.

27 Claims, No Drawings

SEALING GLASS COMPOSITIONS AND PASTES AND USE THEREOF

This invention relates to PbO-containing glasses, and especially sealing glasses of the $PbO-B_2O_3-ZnO$ type.

PbO-containing sealing glasses, and particularly $PbO-B_2O_3-ZnO$ sealing glasses, are most commonly used commercially to seal the glass face plate to the glass funnel of a cathode-ray tube such as, for example, a color television tube. Such sealing glasses have the property of melting and flowing at low temperature, i.e., usually below 500° C. and most frequently between 440° and 475° C. This facilitates the wetting of the glass surfaces to be sealed. Furthermore, such sealing glasses are customarily thermally devitrifiable or thermally crystallizable in nature and the final, resultant devitrified or crystallized seal that is formed has a melting point temperature which is higher than the fiber softening point temperature of the original sealing glass. Because of the natural tendency or propensity of the PbO constituent in the sealing glass to be reduced to metallic lead during the course of heat sealing in a reducing atmosphere or in the presence of deleterious organic vapors, special precautions must be taken by television tube manufacturers to prevent any such reduction of PbO, since reduction of the PbO constituent tends to induce dielectric breakdown in the resultant seal when the resultant seal is exposed to high voltage conditions such as exist within a color television tube during its operational use.

Before the glass face plate of a color television tube can be sealed to the glass funnel portion, both members must first undergo a number of different processing steps. For example, according to current conventional practice, the face plate and a metal grid or perforated mask are first mated and then subjected to a compaction process wherein the mated parts are heated at a rate of about 10° C. per minute to a temperature of from about 440°-460° C. and held at this temperature for about 2 hours. This compaction process theoretically results in the densification of the glass, and minimizes the relative shifting which would otherwise result due to differential stress induced movements between the two components during subsequent heating and cooling steps encountered in the further fabrication and assembly of the television tube. After the components are cooled, the grid or perforated mask is disassociated from the face plate and marked for subsequent mating with the same glass face plate.

The face plate is then subjected to the separate and successive application of green, blue and red phosphors by known techniques, and, in some instances, to the application of a carbon or graphite background surrounding the phosphors and providing a sharp contrast thereto. The phosphors are present as a multiplicity of individual dots or stripes in an ordered arrangement on the inner surface of the face plate. A resinous or plastic film may be applied to the surface of the phosphors, and the inner surface of the face plate is subsequently aluminized, i.e., a thin aluminum film is deposited, so that an electrically conductive surface is formed. This aluminized surface is connected to a metal stud on the inner surface of the face plate.

During the course of phosphor application and aluminization, at least about nine different organic compounds are usually applied to the inner surface of the face plate, in association with the phosphors, etc., and these compounds must be subsequently removed from the face plate or face panel. Such removal is customarily accomplished by a bake out process during which the organic compounds are volatilized or vaporized at a temperature of from 400°-450° C. However, since such organic vapors are deleterious to the PbO constituents in the sealing glass used to seal the face plate to the funnel, the bake out step must be performed prior to any such sealing. Otherwise, if such vapors were permitted to contact the sealing glass during the sealing process, they would reduce the PbO constituents in the sealing glass to metallic lead, and ultimately cause a dielectric breakdown to occur in the resultant seal during operational use of the television tube. Such a tube is therefore unacceptable for use, and is rejected when it fails a voltage test to which it is submitted during standard testing procedures subsequently conducted at the tube manufacturing plant. Since the high voltages present in a television tube during its operation in a television set range from about 15 K volts to 30 K volts for a black and white television tube to 20 K volts to 35 K volts and higher for a color television tube, any dielectric breakdown in the seal between the funnel and face plate will provide an unacceptable source of malfunction of the tube.

After the completion of the bake out process, during which the organic vapors are volatilized or vaporized and removed, a sealing glass is applied to the mating edge surfaces of the funnel. The components are assembled, fired in a non-reducing atmosphere at a temperature sufficiently elevated (viz. about 425°-475° C.) to fuse the sealing glass, and then cooled, thereby resulting in the formation of a strong, adherent hermetic bond of devitrified or crystallized sealing glass between the face plate and funnel components.

After the face plate has been thus sealed to the funnel portion of the tube, the interior confines of the tube are evacuated by applying a vacuum thereto. While being evacuated, the tube must be heated to a temperature within the range of about 340°-410° C. in order to assure that all volatile, deleterious substances, such as moisture and organic materials, are liberated and withdrawn from interior surfaces and confines of the tube. The application of heat to the tube inevitably results in some relational shifting of the face plate, funnel and solder glass seal with respect to one another. Because the seal is usually devitrified or crystallized and thus in a rigid state even during the heating operation, the relational shifting of parts leads to the formation or incurrence of physical stresses in the vicinity of the seal, especially when the tube is subsequently cooled. These stresses can result in the formation of cracks in the seal, and even cracks in the face plate or funnel and can lead to implosion of the sealed tube. As a result, the tube is frequently destroyed or, at best, is, of course, rejected as defective by the manufacturer.

Thus, as described above, in the operational interval between the initial mating of the metal grid or perforated mask to the face plate and the evacuation of the sealed face plate and funnel, from about eight to about fourteen separate processing operations take place, such as, for example, inspections, phosphor applications, bake out operations, face plate to funnel sealing, and cleaning of various components after various treatments, etc. Elimination of any or all of the steps between the initial mating of the mask with the face plate and the evacuation of the sealed tube would result in a saving of labor, time, and energy consumption, and would appreciably decrease the cost of manufacturing the completed color television tube.

U.S. patent application Ser. No. 246,316, filed Apr. 21, 1972, and entitled SEALING GLASS COMPOSITION AND METHOD FOR MAKING SAME, now abandoned, discloses a composition and method that make it possible for the television tube industry to bake out and remove the organic compounds from the face plate simultaneously with the sealing of the face plate to the funnel, without reducing the PbO constituent in the sealing glass to metallic lead. In the aforementioned application Ser. No. 246,316, the entire disclosure of which is relied upon and incorporated herein by reference, it is taught that the chemical reduction of the PbO constituent in a PbO-containing glass frit can be prevented by combining the frit with a higher oxide of a cation, which is thermally stable at the temperatures at which the sealing glass frit seals the glass surfaces together, but which can be reduced to a lower oxide of the cation when exposed to the reducing conditions. Typical of such oxides are $Pb_3O_4$ and $BaO_2$.

U.S. patent application Ser. No. 516,900, filed Oct. 22, 1974, and entitled SEALING GLASS VEHICLE AND COMPOSITION AND METHOD FOR MAKING SAME, now U.S. Pat. No. 3,973,975, discloses additional oxides and compounds which are also capable of preventing or retarding PbO reduction in a PbO-containing sealing glass. The entire disclosure of application Ser. No. 516,900, now U.S. Pat. No. 3,973,975, is also relied upon and incorporated herein by reference.

The compaction process previously described is required when the color television tube is subjected to processing temperatures of about 440° C. or higher, such as, for example, during frit glass sealing of the face plate to the funnel portion of the tube. It is believed that the compaction process would not be necessary if the temperatures to which the face plate and grid or perforated mask are subjected or exposed during processing could be reduced to temperatures of 400°–415° C. or lower. Processing at such low temperatures, however, has not heretofore been commercially achievable because of the unavailability of a suitable sealing glass that is capable of being fired at about 400° C. to form a strong, adherent, hermetic seal between the face plate and funnel. Firing at 400° C. or lower would not only make it possible to eliminate the compaction process thereby eliminating a costly and time and energy consuming manufacturing step, but would also permit further energy conservation through the utilization of a lower processing temperature during the face plate and funnel sealing operation.

U.S. patent application Ser. No. 493,091, filed July 30, 1974, and entitled SOLDER GLASS WITH REFRACTORY FILLER, now U.S. Pat. No. 3,954,486 discloses a glass composition capable of being fired at about 400° C., and the entire disclosure of application Ser. No. 493,091 is relied upon and incorporated herein by reference. This latter application describes a blend of particulate lead-borate solder glass and particulate low expansion refractory filler having a particle size diameter in excess of about 37 microns. The filler makes it possible to effect a significant decrease in the coefficient of thermal contraction of the glass upon fusion sealing, without a substantial reduction in the flow properties of the glass.

Even by combining the teachings of the aforementioned patent applications, however, it still has not been possible to provide a sealing glass and sealing method that result in the formation of an adequate seal between the face plate and funnel of a color television tube. For example, a solder glass of the type disclosed in application Ser. No. 493,091, now U.S. Pat. No. 3,954,486, was used to seal the face plate and funnel components in a television tube. However, the resultant seal failed to achieve the requisite seal strength necessary to successfully withstand required, standard thermal shock tests and pressure tests (i.e., the funnels could be pulled apart from the face plates too easily).

Thus, there exists a need in the art for a sealing glass composition that can be used as a solder glass for sealing the face plate to the funnel portion of a color television tube, and a sealing method to accomplish this result. This envisions the need for a sealing glass which is capable of being fired at a temperature of about 400° C. Such a capability is extremely important in the manufacture of color television tubes since it makes it possible to eliminate the necessity of employing a costly and time and energy consuming compaction process. Such a low temperature sealing capacity would also be very advantageous in sealing and encapsulating microelectronic packages. Moreover, the sealing glass should be capable of being rendered resistant to substantial chemical reduction of PbO in the glass to metallic lead when the sealing glass is exposed to reducing conditions during sealing or firing. Additionally, the sealing glass should flow sufficiently during the firing operation to result in the formation of a strong, adherent, hermetic bond, such as, for example, between the face plate and funnel portion of a color television tube. Further, the resulting seal should possess a coefficient of thermal expansion which is closely compatible with the parts or components which it seals. Further, in its applicability to the manufacture of color television tubes, it would be very desirable if the glass composition and method could aid in alleviating the problems encountered during and after heating and evacuation of a TV tube, which comprise the final stages in the manufacturing process.

Accordingly, this invention aids in fulfilling these needs in the art by providing a particulate glass composition comprising:

A. a PbO-containing glass frit having a sealing or firing temperature within the temperature range of about 350° to about 415° C.;

B. at least one particulate refractory filler having a coefficient of thermal expansion of less than about $65 \times 10^{-7}$ in./in./° C. (0°–300° C.) and a particle size distribution of about:

| % of Particles | Microns |
|---|---|
| 90 | 40–60 |
| 75 | 30–45 |
| 50 | 15–35 |
| 25 | 7–20 |
| 10 | 2–10 |
| 5 | 0.5–3 | and

C. at least one particulate refractory filler having a coefficient of thermal expansion of less than about $65 \times 10^{-7}$ in./in./° C. (0°–300° C.) and a particle size distribution of about:

| % of Particles | Microns |
| --- | --- |
| 90 | 5–10 |
| 75 | 3–8 |
| 50 | 2–4 |
| 25 | 0.8–2.5 |
| 10 | 0.5–2.0 |
| 5 | 0.2–1.5 |

This invention also provides a sealing glass composition for sealing a face plate to a funnel of a television tube, wherein the composition comprises:

A. a PbO-containing glass frit having a sealing temperature within the temperature range of about 350° to about 415° C.;

B. at least one particulate refractory filler having a coefficient of thermal expansion of less than about 65 × 10$^{-7}$ in./in./° C. (0°–300° C.) and a particle size distribution of about:

| % of Particles | | Microns |
| --- | --- | --- |
| 90 | = | 40–60 |
| 75 | = | 30–45 |
| 50 | = | 15–35 |
| 25 | = | 7–20 |
| 10 | = | 2–10 |
| 5 | = | 0.5–3 | and

C. at least one particulate refractory filler having a coefficient of thermal expansion of less than about 65 × 10$^{-7}$ in./in./° C. (0°–300° C.) and a particle size distribution of about:

| % of Particles | | Microns |
| --- | --- | --- |
| 90 | = | 5–10 |
| 75 | = | 3–8 |
| 50 | = | 2–4 |
| 25 | = | 0.8–2.5 |
| 10 | = | 0.5–2.0 |
| 5 | = | 0.2–1.5 | and

D. at least one additive in an amount sufficient to prevent said PbO from being chemically reduced when said glass frit is being fired in the presence of reducing conditions at a temperature sufficient to seal said glass.

Additionally, this invention provides a sealing glass paste comprising:

A. the particulate glass composition or sealing glass composition of this invention;

B. a binder selected from the group consisting of nitrocellulose, hydroxypropylcellulose and mixtures thereof; and C. a solvent for the binder.

Further, this invention provides a method of sealing a face plate to a funnel portion of a cathode ray tube, such as a color television tube, with a PbO-containing sealing glass, comprising the steps of:

A. applying between the sealing edges of the face plate and funnel portions a sealing amount of a sealing glass composition of this invention;

B. subjecting the applied sealing glass composition to a sealing temperature within the sealing temperature range of between about 350° and 415° C. for a period of time sufficient to fuse said sealing glass composition and form a vitreous seal to and between the sealing edges of the face plate and funnel portions.

Still further, this invention provides a method of sealing a face plate to a funnel portion of a color television picture tube with a PbO-containing sealing glass in the presence of organic vapors capable of reducing the PbO in said sealing glass, comprising the steps of:

A. applying between sealing edges of the face plate portion having phosphors applied thereto and funnel portion a sealing amount of a sealing glass composition of this invention;

B. subjecting the face plate portion and funnel portion and sealing glass composition to a temperature sufficient to fuse the sealing glass composition onto the face plate portion and funnel portion;

C. while simultaneously with step (B) baking the face plate and funnel, including the phosphors, thereby resulting in the liberation of the organic vapors; and/or D. cooling the resulting assembly comprising the faceplate, funnel and sealing glass while simultaneously evacuating the interior of the assembly by applying a vacuum thereto.

In practicing this invention, it is believed that any PbO-containing glass frit having a sealing or firing temperature within the temperature range of about 350° C. to about 415° C. can be employed. The glass frit is also referred to herein as the "base glass". The lead-borate and lead-zinc-borate solder glasses are preferred. Such glasses are well-known in the solder glass art, and examples can be found in U.S. Pat. No. 3,778,242. The particle size of the glass frit is not particularly critical to the practice of the present invention, and any conventional particle size distribution can be employed. Typically, the particle size of the glass frit will be such that about 100% of the particles pass a 100 mesh screen, and at least about 60% pass a 400 mesh screen. As used herein, mesh sizes refer to U.S. Standard Sieve Series. It is the particle size distribution of the filler or fillers rather than the particle size of the base glass that is critical in the present invention.

Such lead-borate and lead-zinc-borate base glasses usually possess a rod stress within the tensional stress range of about 1500 p.s.i. to about 3500 p.s.i. over the temperature range from the sealing temperature of the glass to room temperature. Such glasses are known for use in forming vitreous seals as well as glass-ceramic or semi-crystalline seals.

The lead-borate and lead-zinc-borate glasses suitable for use in the present invention typically have the following oxide composition (as calculated from raw batch starting materials) expressed in weight percent, and wherein the total content of all oxides is 100%:

| Oxides | Usual Range | Preferred Range | Particularly Preferred Value |
| --- | --- | --- | --- |
| PbO | 75–86 | 80–86 | 83.7 |
| $B_2O_3$ | 8–15 | 10–15 | 12.5 |
| ZnO | 0–16 | 0–5 | 2.8 |
| $SiO_2$ | 0–5 | 0–3 | 0.4 |
| BaO | 0–2 | 0–3 | 0.6 |
| $SnO_2$ | 0–2 | — | — |

Other conventional glassmaking oxides such as CaO, CuO, $Bi_2O_3$, $Na_2O$, $K_2O$, $Li_2O$, CdO, and $Fe_2O_3$ can be included. However, it is preferred in many instances not to employ these constituents, but rather to provide compositions which consist essentially only of those constituents set forth above. Thus, for example, alkali metal oxides are generally not included when the base glass is intended for use as a sealant for a microelectronic package, because alkali metal ions in the resultant seal are known to migrate, causing adverse characteristics in the electrical properties of the package.

When the glass composition of this invention is used in sealing television picture tubes, it is preferred that a lead-zinc-borate glass be employed as the PbO-containing glass frit. It is also preferred that the base glass have the following properties:

a. a glassy edge of about 315° to about 390° C., preferably about 345° C., as determined by a gradient boat test;
b. a devitrification edge of about 380° C. to about 425° C., preferably about 405° C., as determined by a gradient boat test;
c. a button flow of about 1.050 to about 1.250 inches diameter, preferably about 1.200 to about 1.205, inches diameter; and
d. a rod stress within the tensional stress rang of about 1500 p.s.i. to about 3500 p.s.i., preferably about 2200 p.s.i. to about 2800 p.s.i., especially about 2500 p.s.i.

The particularly preferred based glass composition set forth above is especially well-suited for color television picture tube applications.

As used herein, the "gradient boat test" has the following meaning. A Marshall gradient furnace having 11 thermocouples therein spaced one inch apart is employed. The boat is cleaned, and then filled with the glass composition to be tested. The glass composition is packed into the boat, exercising care to scrape off excess glass adhering to the boat. The boat is then inserted into the gradient furnace to a depth of 3⅝ inches and there fired for 60 minutes at 910° F. Five minutes prior to the end of the firing cycle, a probe of the furnace gradient is made using the thermocouples, and a read-out is made on a recorder. The fired boat is then removed from the gradient furnace and allowed to cool. There will then be two readily discernible regions of physical change upon visual observation of the fired glass composition in the boat. The first is a change in the surface appearance of the fired glass composition from a particulate state to a glassy state. The temperature where this transition first commences is called the "glassy edge" or "sintering edge". The other readily discernible region of physical change occurs where the surface of the fired glass composition changes from a shiny or glossy appearance to a dull appearance. This indicates the change of the glass from a vitreous state to a crystalline state. The temperature where this transition first commences is called the "crystallization edge". Thus, as used herein, the glassy edge refers to the temperature corresponding to the point where the fired glass composition first assumes a shiny appearance, while the crystallization edge refers to the temperature corresponding to the point at which the fired glass is first transformed from a vitreous state to a crystalline state. "As used herein, "button flow" is determined according to the following procedure. Ten grams of the glass composition to be tested are placed into a compaction die having a cavity of ¾ inch diameter by 2 inches long. A plunger is inserted into the die, and 1000 p.s.i. pressure is applied to the glass to form a pressed pellet. The pressed pellet is then transferred to the center of a 2 × 2 × ¼ inch clean, dry, glass plate, exercising care not to chip or crumble the pellet. The glass plate having the pellet thereon is then fired in a furnace according to the known or predetermined firing cycle for the glass composition. After the resulting button is cool enough to handle, the button diameter is measured at four points spaced at intervals of 45°. The average diameter of the button is then computed from these four values. This average button diameter is used herein as the "button flow" expressed in inches.

The rod stress values employed in describing this invention are determined by the following procedure. A glass rod is selected from cane having a diameter of ¼ inch and free of cords, seeds, bubbles or other flaws. The glass rod is then cut into lengths from ¾ to 1¼ inches exercising care not to chip the edges of the rod. Both ends of the rod are then cut at right angles to the axis of the cane, and one end is polished. The rod is then annealed by firing in an annealing furnace at a temperature of 25° C. above the annealing point of the glass for a period of 30 minutes. If stress is still present (as determined with a polarimeter) after annealing, the rod must be reannealed. The rod is then placed in a 1 × 3 inches sample holder having a 5/16 inch diameter hole, ¼ inch deep, and a set screw. The unpolished end of the rod is placed into the 5/16 inch hole, and the rod snuggly tightened with the set screw while maintaining the axis of the rod in a near-vertical position. The polished end of the rod is then cleaned with alcohol or freon. About 2 grams of the fritted glass composition to be tested are placed in a clean mixing dish, and about 6 drops of a vehicle comprising 1.2 weight percent nitrocellulose in amyl acetate are added thereto. The resulting mixture is stirred until a viscous slurry is formed. More vehicle may be added, a drop at a time, until the desired consistency is obtained. The slurry is then applied in layers to the polished end of the rod until the height of the glass composition is between 0.08 and 0.10 inches. The rod is then air-dried for at least two hours, after which the entire sample holder including the rod is placed in a furnace. The glass composition is then fired at its firing temperature. After cooling, the rod is then placed in a polarimeter to locate the best stress pattern. The peripheral region in which the pattern of stress is most uniform is then marked on the rod. Thereafter, a belt surfacer is used to grind away just enough glass so as to expose a small portion of the seal interface at the location marked. The opposite side of the seal is also ground parallel to the initially ground side so that there results a finished seal with two parallel, ground faces which are perpendicular to the seal interface. The thickness is about 0.50 cm. The stress can then be determined at the center of the interface by using a polarimeter. The glass rod used for the rod stress measurements has the following composition:

| Constituent | Wt.% |
|---|---|
| $SiO_2$ | 64.0 |
| $Al_2O_3$ | 3.9 |
| $Na_2O$ | 7.7 |
| $K_2O$ | 9.9 |
| CaO | 3.6 |
| MgO | 1.3 |
| BaO | 7.8 |
| $CeO_2$ | 0.3 |

-continued

| Constituent | Wt.% |
|---|---|
| Sb$_2$O$_3$ | 0.45 |
| F$_2$ | 1.0 |
| Fe$_2$O$_3$ | 0.05 |

It will be understood that the rod stress is a measure of the mismatch in the coefficients of thermal expansion between the base glass employed in forming a seal and the materials to be sealed together. In most instances, it is desirable for the rod stress to be near zero, which indicates the coefficients of thermal expansion will then be substantially the same. If the coefficients of thermal expansion are significantly different from one another, then the mismatch will be great and the stress will be high. Thus, rod stress is a measure of the mismatch that can be tolerated.

The particulate refractory fillers employed in this invention can be any of such well-known materials, synthetic or natural, conventional in the art. The refractory fillers have coefficients of thermal expansion of less than about 65 and usually less than about 40 × 10$^{-7}$ in./in./° C. (0°–300° C.). These refractory fillers include refractory oxides, such as silica; lithium aluminosilicates, including β-spodumene, petalite, -eucryptite and low expansion lithium aluminosilicate glass-ceramics, as described in U.S. Pat. No. 3,788,865 (with or without colorants); alumina; aluminosilicates, including mullite clays and other clays; zirconia; tin oxide; and zircon. Of these lithium aluminosilicates, aluminosilicate clays and zircon are preferred for efficiency and economy. For best results, the refractory filler employed should be capable of decreasing the coefficient of thermal expansion of the base glass by at least about 1–35 × 10$^{-7}$ in./in./° C. over the temperature range of 0°–300° C., when used in a proportion of up to about 25% by weight of the blend. Zirconium silicate having the formula ZrSiO$_4$ is particularly preferred for this purpose.

The particulate refractory filler referred to herein as "coarse filler" has a particle size distribution of about:

| % of Particles | Microns-Usual | Microns-Preferred | Microns-Particularly preferred |
|---|---|---|---|
| 90 | 40–60 | 45–60 | 46–50 |
| 75 | 30–45 | 35–45 | 36–40 |
| 50 | 15–35 | 20–35 | 24–28 |
| 25 | 7–20 | 10–20 | 10–14 |
| 10 | 2–10 | 3–10 | 3–5 |
| 5 | 0.5–3 | 1–3 | 1–3 |

The best refractory filler for use as coarse filler in a sealing glass or base glass in color television tube applications consists essentially of zirconium silicate having a particle size distribution of about:

| % of Particles | Microns |
|---|---|
| 90 | 48 |
| 75 | 39 |
| 50 | 26 |
| 25 | 12 |
| 10 | 4 |
| 5 | 2 |

The particulate refractory filler referred to herein as "fine filler" has a particle size distribution of about:

| % of Particles | Microns - Usual | Microns - Preferred |
|---|---|---|
| 90 | = 5–10 | 7–9 |
| 75 | = 3–8 | 4–6 |
| 50 | = 2–4 | 2–4 |
| 25 | = 0.8–2.5 | 1.2–2.2 |
| 10 | = 0.5–2.0 | 0.8–1.6 |
| 5 | = 0.2–1.5 | 0.7–1.3 |

A zirconium silicate filler having the following approximate particle size distribution is especially effective when used as the fine filler in a sealing glass or base glass for color television tube applications:

| % of Particles | Microns |
|---|---|
| 90 | 8 |
| 75 | 5 |
| 50 | 3 |
| 25 | 2 |
| 10 | 1 |
| 5 | 1 |

While both the coarse filler and the fine filler are each preferably comprised of zirconium silicate, it will be understood that the fillers need not have the same chemical make-up. Thus, for example, the coarse filler can be zirconium silicate and the fine filler a refractory of different chemical make-up. In short, any combination of refractory fillers can be employed.

It will be apparent to persons skilled in the art that the particle size distribution, as expressed herein, is a cumulative distribution. Thus, for a specified percentage of particles, all of such particles have a particle size equal to or less than a given value or range of values.

As previously described, it is sometimes necessary or desirable to fire the PbO-containing base glass under conditions in which the PbO would ordinarily be chemically reduced to metallic lead. This can be prevented by the use of an additive. As used herein, the term "additive" means any substance, which can be used in an amount sufficient to prevent the PbO from being chemically reduced when the glass frit is being fired in the presence of reducing conditions at a temperature sufficient to seal the glass. The additive must be compatible with the base glass; that, the additive should not produce a substantial adverse effect upon the properties of the base glass after it has been fired. Typical of the additives are:

1. a hydroxide or a higher oxide of a cation, wherein the hydroxide and oxide are thermally stable at the sealing temperature of the frits, and further wherein the hydroxide and the oxide are capable of being chemically reduced when exposed to the reducing conditions;
2. an inorganic nitrate having a thermal decomposition temperature of about 30°–600° C., a melting point temperature of about 36°–264° C. and containing water of hydration;
3. an inorganic nitrate having a melting point temperature lower than the firing temperature of the PbO-containing glass frit and a thermal decomposition temperature higher than the firing temperature of the PbO-containing glass frit;

4. an inorganic nitrate having a melting point of about 414°–592° C.;
5. an inorganic nitrate which is thermally decomposable between about 150° C. and the fiber softening point temperature of the glass frit to yield $HNO_3$;
6. an inorganic carbonate which is thermally decomposable to yield carbon dioxide above the firing temperature of the glass frit;
7. an inorganic, oxygen-containing chlorine compound having a thermal decomposition temperature above athe firing temperature of the glass frit; and
8. an inorganic dichromate having a decomposition temperature of not more than about 100° C. below to not more than about 100° C. above the firing temperature of the glass frit.

Compounds having the properties required of the additives are readily available. Commercial grades of the chemicals have been found to be suitable for use in this invention.

Typical of the compounds in group (1) are $Pb_3O_4$, $BaO_2$, $CrO_3$, $MnO_2$, $Mn_2O_3$, $Fe_2O_3$, $Fe_3O_4$, $CuO$, $Cu_2O$, and $Tl_2O_3$. Other oxides include $Sb_2O_5$, $TeO_2$, $Ta_2O_5$, $Nb_2O_5$, $CeO_2$ and $Bi_2O_3$.

Other oxides that produce an observable effect are compounds having a thermal decomposition temperature of less than about 400° C. Typical of these oxides is $As_2O_5$. These compounds decompose to yield free oxygen within the range of temperatures to which the sealing glass frit is subjected during firing.

In addition to the oxides, inorganic nitrates can substantially retard the chemical reduction of PbO in a PbO-containing sealing glass. The nitrates can be divided into three groups. The first group generally produces the most prominent effects, and is characterized by compounds having decomposition temperatures of about 30°–600° C., melting points of about 36°–264° C. and water of hydration. Typical of the compounds within this group are $Ca(NO_3)_2 \cdot 4H_2O$; $Zn(NO_3)_2 \cdot 6H_2O$; $La(NO_3)_3 \cdot 6H_2O$; $Bi(NO_3)_3 \cdot 5H_2O$; $Ce(NO_3)_3 \cdot 6H_2O$; $Ni(NO_3)_2 \cdot 6H_2O$; and $Cd(NO_3)_2 \cdot 4H_2O$. A second group of nitrates generally yields results comparable to the compounds of the first group of nitrates, and this second group is characterized by compounds having melting points lower than the firing temperatures of the PbO-containing sealing glass, and thermal decomposition temperatures higher than the firing temperature of the PbO-containing sealing glass. Typical of the compounds within this second group are $LiNO_3$ and $AgNO_3$. A third group of nitrates, which is less effective than the first and second groups, yet produces observable effects is characterized by compounds having melting points of about 414°–592° C. Typical of the compounds within this group are $CsNO_3$, $Pb(NO_3)_2$ and $Ba(NO_3)_2$.

Still another group of inorganic nitrates has been found which is especially effective with sealing glass pastes containing a cellulosic binder. This group is characterized by nitrates which thermally decompose to yield $HNO_3$ at a temperature between about 150° C. and the fiber softening point temperature of the sealing glass. Typical of such compounds are $Cu(NO_3)_2 \cdot 3H_2O$ and $BiO(NO_3) \cdot H_2O$. Although the mechanism of operation is not fully understood, it is theorized that these compounds liberate $HNO_3$ which in turn reacts with the cellulosic binder resulting in the formation of a nitrocellulose-type binder, i.e., a cellulose binder having nitro-groups therein. It is known that the pyrolysis of nitrocellulose binders is not as problematical as, for example, the pyrolysis of a hydroxypropyl cellulose binder, in chemically reducing the PbO in a PbO-containing sealing glass. Thermal decomposition of hydroxypropyl cellulose results in the liberation of organic compounds capable of chemically reducing PbO. Thus, in the manufacturing operation carried out in the manufacture of color television tubes, not only does the manufacturing step of baking out the phosphor containing organic compositions applied to the interior surface of the face plate lead to the formation of harmful, volatilized organic compounds, also the thermal decomposition of the binder constituents of the sealing glass paste tends to result in the reduction of the PbO constituent in the base glass to metallic lead unless otherwise prevented.

Another group of inorganic compounds that is capable of substantially retarding the chemical reduction of PbO in PbO-containing sealing glasses comprises metal hydroxides which function in essentially the same manner as the oxides. That is, this class of compounds includes hydroxides which are thermally stable at the temperatures to which the sealing glass is fired and do not thermally decompose within the firing temperature range, but which react when exposed to reducing conditions that exist during firing of the sealing glass. Typical of such hydroxides are $ZrO_2 \cdot xH_2O$ LiOH; $Li(OH) \cdot H_2O$; $Zn(OH)_2$; and $Ba(OH)_2$. In the case of the hydroxides, the water of hydration does not appear to have any significant effect. For example, substantially anhydrous lithium hydroxide and hydraded lithium hydroxide yield substantially the same observable effects.

A less effective group of inorganic hydroxides includes hydroxides which thermally decompose at a temperature below the temperature at which the sealing glass is capable of effectively sealing glass surfaces together. Typical of these compounds is $Mg(OH)_2$.

Still another group of inorganic compounds that substantially retard the chemical reduction of PbO in PbO-comtaining sealing glasses comprises certain metal carbonates. These carbonates can be characterized by compounds that yield carbon dioxide at temperatures above the firing temperature of the sealing glass. Typical of such compounds is $MgCO_3$, which gives pronounced visible effects.

Another group of carbonates that is less effective than magnesium carbonate includes $CdCo_3$ and $ZnCO_3$. Compounds within this second group lose carbon dioxide within a temperature range of about 300°–500° C. and exhibit greater observable effects when employed with PbO-containing sealing glasses having relatively low firing temperatures, such as 400° C. or lower.

Inorganic oxygen-containing chlorine compounds can also be employed as additives to a PbO-containing sealing glass frit. While any inorganic, oxygen-containing halogen compound can be employed in this invention, preferably the compound has a thermal decomposition temperature above the firing temperature of the sealing glass. The perchlorates are particularly preferred, especially $KClO_4$.

Still another group of inorganic additives are the dichromates. More particularly, one can employ an effective amount of $K_2Cr_2O_7$. Generally, any dichromate can be employed provided that it possesses a decomposition temperature not more than about 100° C. below or not more than about 100° C. above the firing temperature of the PbO-containing sealing glass with which it is to be used.

Another group of inorganic additives includes persulfates and peroxysulfates having a high oxygen content (e.g., about 7 to 8 oxygen atoms). Such compounds having a thermal decomposition temperature higher than about 300° C. are preferred. $K_2S_2O_7$ and $K_2S_2O_8$ have been found to give positive effects.

Surprisingly, it has been discovered that $P_2O_5$ does not function properly with a PbO-containing solder glass having a firing temperature above about 400° C. Since $P_2O_5$ has a sublimation temperature of about 300° C., this suggests that the use of materials which have sublimation temperatures below the firing temperature of the glass frit should be avoided.

Usually, the effectiveness of an additive can be determined visually by comparing the colors of fired frits with and without additive. The formation of free lead or a lower oxide of lead during firing is characterized by a gray or black color appearing in the fired frit unless, of course, the additive itself is black or gray in color. In all cases, dielectric tests can be used to determine the presence of metallic lead, and therefore, the effectiveness of the additive.

When the particularly preferred PbO-containing glass frit previously described is employed, the following effects have been observed. $Bi(NO_3)_3.5H_2O$ yields the most prominent visually observable effects at low concentration levels. Other additives that are effective at concentration levels of at least 0.2 weight percent are:

$BiONO_3.H_2O$
$Fe_2O_3$
$Ni(NO_3)_2.6H_2O$
$Cu(NO_3)_2.3H_2O$
$Cd(NO_3)_2.4H_2O$
$MnCO_3$

The following additives are also effective, but must generally be employed in the particularly preferred frit at concentration levels of at least about 0.8 weight percent in order to obtain visually observable effects:

$Tl_2O_3$
$Ca(NO_3)_2.3H_2O$
$Ba(OH)_2.8H_2O$
$Ce(NO_3)_3.6H_2O$
$K_2S_2O_7$
$CrO_3$
$Sb_2O_5$

Additives that produce visually observable effects at concentrations of at least about 1.5 weight percent in admixture with the particularly preferred glass frit are:

| | |
|---|---|
| $Ba(NO_3)_2$ | $H_3BO_3$ |
| $AgNO_3$ | $Cs(NO_3)_2$ |
| $Pb(NO_3)_2$ | $Cu_2O$ |
| $Mn_2O_3$ | $Fe_3O_4$ |
| $MnO_2$ | $K_2S_2O_8$ |
| $As_2O_5$ | $Mg(OH)_2$ |
| $LiNO_3$ | $CuO$ |
| $Na_2O_2$ | $Zn(OH)_2$ |

The proportions of the various ingredients employed in the compositions of this invention can readily be determined as follows. Initially, the amount of PbO-containing glass frit will largely depend upon the firing time. If the frit comprises only about 70 weight percent of the composition, then it will be necessary to fire the composition for about an hour or more. The firing time is reduced, however, if the amount of glass is increased. Thus, if the amount of glass is at least about 76 weight percent, the the firing time can be reduced to about 20-30 minutes. In most applications, the amount of the PbO-containing glass frit will be at least about 70% by weight of the total composition and preferably at least about 75 weight percent. When an additive is used to prevent the chemical reduction of the PbO, the additive can be substituted for a portion of the frit.

The refractory fillers reduce the button flow and coefficient of thermal expansion of the glass composition, and can affect the differential thermal analysis (DTA) of the base glass. The coarse refractory filler reduces the button flow and DTA much less than a corresponding amount of a fine refractory filler. On the other hand, the coarse refractory filler changes the composite thermal coefficient of expansion or contraction more than a corresponding amount of a fine refractory filler. Thus, the relative amounts of coarse refractory filler and fine refractory filler employed in accordance with this invention will depend upon the extent to which the button flow, rod stress and DTA of the base glass vary from the desired values. By adding the proper amounts of coarse refractory filler and fine refractory filler, it is possible to precisely tailor both the flow properties and the coefficient of thermal expansion of the sealing glass composition.

While the relative properties of base glass, coarse refractory filler and fine refractory filler can be determined with a minimum of experimentation, the amounts of each ingredient will fall within the following percentage ranges. These values apply when no additive is used, and the amounts of the various ingredients will total 100 weight percent.

| USUAL RANGE | % BY WEIGHT |
|---|---|
| Base Glass | At least about 70 |
| Coarse Filler | about 10-25 |
| Fine Filler | about 0.25-10 |
| PREFERRED RANGE | % BY WEIGHT |
| Base Glass | At least about 75 |
| Coarse Filler | about 14-22 |
| Fine Filler | about 0.5-4 |
| PARTICULARLY PREFERRED RANGE | % BY WEIGHT |
| Base Glass | About 80 |
| Coarse Filler | about 18-19 |
| Fine Filler | about 1-2 |

The amount of the additive used to prevent the chemical reduction of the PbO will depend upon the relative effectiveness of the additive. The foregoing description of the relative effectiveness of additives, when employed with the particularly preferred base glass, can be used as a guide for this purpose. In its broadest context, this invention contemplates the optional use of the additive depending upon whether, or not the sealing glass composition will be subjected or exposed to reducing conditions. If used, the additive may be included in the sealing glass composition in an amount sufficient to prevent or substantially retard the chemical reduction of the PbO. Typically, when used, the additive will be included in an amount of about 0.01 to about 5 weight percent, and preferably in an amount of about 0.1 to about 1.5 weight percent of the sealing glass composition. The particularly preferred additive, $Bl(NO_3)_3.5H_2O$ is typically employed in an amount of about 0.01 to about 1 weight percent of the sealing glass composition, and preferably about 0.08 to about 0.3 weight percent when employed with the particularly preferred base glass.

The sealing glass paste of this invention can be prepared according to known techniques. Nitrocellulose dissolved in amyl acetate is a well-known binder for sealing glasses; the amount of nitrocellulose in solution is usually about 1 to about 1.4%. Nitrocellulose binders can be used with the glass compositions of the invention to form the pastes of the invention; however, the resulting pastes will be subject to a relatively short shelf life unless the binder comprises about 5 to about 30% by weight of a hydroxypropyl cellulose and about 95 weight percent to about 70 weight percent nitrocellulose. While a 4% hydroxypropyl cellulose solution is a suitable binder, other solution strengths of this binder can also be used.

The hydroxypropyl cellulose can vary from a molecular weight of about 40,000 to a weight of 300,000 or more. At much higher values, it becomes more difficult to utilize. Other known binders can also be utilized in the sealing glass paste of the invention as long as they perform the function of holding the solder glass frit in a ribbon form for a period of time sufficient to enable the mating pieces, e.g., in the case of a color television tube to enable the face plate and funnel to be joined and sealed. The amount of binder necessary for the paste is that amount which will maintain the solder glass frit in a wet form, extrudable as a bead or ribbon which holds its extruded shape for the necessary length of time, and which is pyrolyzable upon being subjected to a temperature below the temperature at which the sealing glass frit is fired, and which leaves only an unappreciable, if any, amount of residue in the fired frit.

Of the solvents which can be used, amyl acetate is preferred because it volatilizes rapidly from the extruded ribbon, thus permitting the ribbon to be fired more quickly to seal the adjoining glass surfaces. Ethylene glycol methyl ether is also suitable, either alone or in admixture with the amyl acetate. Ethylene glycol ethyl ether, methyl amyl acetate, ethyl hexyl acetate, n-butyl acetate, isobutyl acetate, sec. butyl acetate and diethylene glycol monobutyl ether acetates are other examples of the many solvents for the binders that can be used. The amount of solvent in the paste will depend upon the desired paste consistency, but will usually comprise about five to about fifteen weight percent of the paste.

While the amount of binder which is to be used is that amount which will perform the function of holding the sealing glass frit particles together as an extrudable paste, the weight ratio of sealing glass solids, with the refractory fillers and additives included, to binder solution is usually within the range of about 10:1 to about 12.8:1.

A procedure for carrying out particularly preferred embodiments of this invention will now be described in detail. The following particularly preferred embodiments are especially suitable for use in the manufacture of color television tubes using sealing temperatures of about 400° C.

A base glass is prepared by first preparing a mixture of about 300 to about 1500 pounds of the following oxide ingredients:

|   | Weight Percent |
|---|---|
| PbO | 84.0 |
| $B_2O_3$ | 12.3 |
| ZnO | 2.7 |
| $SiO_2$ | 0.4 |
| BaO | 0.6 |

These oxide ingredients are blended in a conventional mixer for a period of about 20 to 50 minutes, depending upon the batch size. It will be understood that the shorter mixing times are used with the smaller batch sizes.

The resulting blend of oxide ingredients is then melted in a conventional furnace at a temperature of about 1700° F. to about 2300° F. Optimum melting temperatures are about 1750° F. to about 1850° F. The residence time in the melter is about 20 minutes to about 40 minutes, preferably about 25 minutes to about 35 minutes.

The molten glass is then cooled and formed into chips, after which it can be ground into a frit of the desired particle size. This grinding operation preferably takes place in a ball mill, and can be carried out either before or after the addition of refractory fillers. Preferably, the base glass is ground into a frit before the addition of the refractory fillers. After grinding in the ball mill, the resulting product is screened through a 100 mesh screen. The material passing through this screen is collected and transferred to a V-blender to uniformly mix the particles now having different sizes. There then will be obtained a glass frit having a particle size distribution of about:

| % of Particles | Microns |
|---|---|
| 90 | 62–78 |
| 75 | 36–46 |
| 50 | 17–23 |
| 25 | 8–10 |
| 10 | 3–5 |
| 5 | 2.5–3.5 |

A particularly preferred glass composition according to this invention then can be prepared according to the following formula:

|   | Wt.% |
|---|---|
| Base Glass from V-Blender | 80 |
| Coarse Refractory Filler | 18 |
| Fine Refractory Filler | 2 |

The coarse refractory filler is zirconium silicate having the formula $ZrSiO_4$ and a particle size distribution of about:

| % of Particles | Microns |
|---|---|
| 90 | 48 |
| 75 | 39 |
| 50 | 26 |
| 25 | 12 |
| 10 | 4 |
| 5 | 2 |

The fine refractory filler is comprised of zirconium silicate having the formula $ZrSiO_4$ and a particle size distribution of about:

| % of Particles | Microns |
| --- | --- |
| 90 | 8 |
| 75 | 5 |
| 50 | 3 |
| 25 | 2 |
| 10 | 1 |
| 5 | 1 |

This particularly preferred glass composition can be prepared by blending the three ingredients in a ball mill for a period of time sufficient to yield a substantially homogeneous composition.

If it is desired to include an additive in the glass composition, then it is particularly preferred that one percent by weight of the base glass from the V-blender be replaced by one weight percent of a $Bi(NO_3)_3 \cdot 5H_2O$ master blend. The master blend comprises 90 weight percent of the glass frit and 10 weight percent $Bi(NO_3)_3 \cdot 5H_2O$. The base glass and this additive are mixed in a ball mill until a uniform mixture is obtained. The additive is mixed with a small portion of base glass in this manner to form a master blend, and the master blend subsequently added to the base glass-refractory filler mixture in order that the additive can be more readily dispersed throughout the base glass-refractory filler mixture.

After ball milling, the compositions are then subjected to a final blending in a V-blender. This final blending step is employed whether or not an additive is included in the composition. If there is no additive, then the particularly preferred particulate glass composition of this invention comprises the following constituents:

| Constituent | Weight % |
| --- | --- |
| Base Glass | 80 |
| $ZrSiO_4$ | 20 |

If an additive is employed to form a sealing glass composition of this invention, then the particularly preferred composition comprises the following constituents:

| Constituent | Weight % |
| --- | --- |
| Base Glass | 79.9 |
| $ZrSiO_4$ | 20.0 |
| $Bi(NO_3)_3 \cdot 5H_2O$ | 0.1 |

These compositions do not exhibit a DTA peak at 400° C. They are characterized by button flow of 0.900–1.000 inches when subjected to a firing cycle comprising a 10° C. per minute heatup to a peak temperature of 400° C., firing at peak temperature for 30 minutes, followed by a cool-down rate of 5° C. per minute. The rod stress is 1250 ± 250 p.s.i. compression when the same firing cycle is employed and using the reference glass composition previously described in connection with the description of the procedures used to determine rod stress.

24 parts by weight of hydroxypropylcellulose, average molecular weight of 60,000, is poured slowly into 150 parts by weight of amyl acetate, which has previously been heated to 60° C., under continuous stirring. Another 150 parts by weight of amyl acetate are added to the solution and stirred well. 300 parts by weight of ethylene glycol methyl ether is first heated to 60° C. and slowly added to the solution, stirring continuously. A clear solution of 4% by weight hydroxypropyl cellulose is formed.

5 parts by weight of the 4% hydroxypropylcellulose solution thus formed is thoroughly mixed with 95 parts by weight of nitrocellulose dissolved in amyl acetate (1.2% by weight of nitrocellulose in the solvent). The resulting binder is thoroughly mixed with 1170 parts by weight of the sealing glass composition. In this instance, the sealing glass composition included an additive and the amount of additive is included in the 1170 parts by weight of the sealing glass composition.

The resulting solder glass paste can then be extruded as a bead on the sealing surface of a glass funnel of a television tube. The bead of solder glass paste is dried without fusing the solder glass particles. The funnel and a face plate are then mated in sealing relationship, and the resulting tube can be sealed during a firing cycle comprising a head-up period of 5° C. per minute to a peak temperature of 400° C., firing at peak temperature for 30 minutes, and a cool-down rate of 5° C. per minute. During this firing cycle, the solder glass softens, then flows and forms a seal between the face plate and funnel. Because of the presence of the additive, the seal does not turn gray or black, indicating that metallic lead is not formed. Rather, the seal retains a yellow color indicative of the absence of reduction of the PbO constituent in the resultant fused seal.

During the cool-down stage of the firing cycle, evacuation of the interior of the tube by means of a vacuum can be initiated. The use of the coarse refractory filler and fine refractory filler in a relative weight ratio of coarse refractory filler to fine refractory filler of 18:2 makes it possible to commence application of the vacuum at a temperature of about 370° C. If more of the fine filler is used relative to the coarse filler, application of the vacuum can be commenced at a higher temperature, i.e., between 370° and 400° C. If a smaller amount of the fine refractory filler is employed, then the vacuum should be initiated at a lower temperature.

When the glass compositions of this invention are fired at a peak temperature below about 415° C., a substantially vitreous seal can be formed. More particularly, the glass compositions of this invention can be formulated so as to not exhibit a DTA peak during firing at a peak temperature of below about 415° C. While magnification of the seal and visual observation thereof indicate the presence of a small number of crystals, the seal is substantially vitreous as indicated by the absence of a DTA peak during firing. The presence of the crystals that are visually observable is mainly attributable to the crystalline nature of the coarse and fine refractory fillers used. Thus, while suitable base glasses for use in this invention have been described, in part, in terms of their devitrification edge in a gradient boat test, the base glass is not crystallized (as indicated by the absence of a DTA peak) when employed in the glass compositions of this invention and when such glass compositions are fired at a temperature below about 415° C. Nevertheless, the devitrification edge has been found to be a useful parameter for describing the base glass even when these low firing temperatures are employed.

This invention is accompanied by a number of advantages. First of all, the time-temperature relationship used for firing a glass composition of this invention is a substantial improvement over the time-temperature relationship required for prior art compositions. Compositions of the prior art typically required a heat-up rate of about 10° C. per minute to a temperature of 450° C., firing at this peak temperature for 1 hour, followed by a cool-down rate of 7° C. per minute. When this firing cycle is compared with the firing cycle capable of being employed in the present invention, it is apparent that there is a substantial reduction in the firing temperature, and at least a 30 minute reduction in time.

Due to the fact that the sealing glass compositions of this invention can be fired at a temperature of about 400° C., the compaction step required in the manufacture of color television tubes can be eliminated. Since this compaction step was conducted at an elevated temperature, not only are time savings achieved, but also substantial monetary and energy savings.

While the glass compositions of this invention are characterized by relatively high PbO content, and consequently would be especially susceptible to chemical reduction by exposure to volatilized organic compounds, the use of an additive, especially $Bi(NO_3)_3.5H_2O$, even at very low concentrations, enables the worker in the art to prevent chemical reduction of the PbO constituent to metallic lead. Thus, this enables the manufacturer of color television tubes to combine the bake out step for the phosphors applied to the interior of the face plate with the firing step used to seal the funnel and face plate components of the tube.

The particulate refractory fillers enable one to control the coefficient of thermal expansion of the sealing glass composition of this invention. This is especially advantageous in the manufacture of color television tubes for the following reasons. At the usual firing temperature of 440°–450° C., the respective coefficients of thermal expansion of the face plate and the funnel components match reasonably well. The match is not as good, however, at a firing temperature of 400° C. While the glass compositions from which the funnel and face plate components are fabricated could be modified to provide a better expansion match at the 400° C. firing temperature, this would require the manufacturer and distributor of the tube parts to maintain additional inventories to accommodate tube manufacturers who may not be equipped to seal the face plate and funnel components at 400° C. Such compositional changes in the face plate and funnel compositions are unnecessary, however, since the use of the particulate refractory fillers, according to this invention, makes it possible for the worker in the art to adjust the coefficient of thermal expansion of the sealing glass to provide a better expansion match between the face plate and funnel at sealing temperatures of about 400° C.

The particulate refractory fillers also make it possible to control the flow characteristics of the sealing glass. This is especially advantageous, since the button flow of the base glass composition is subject to change from batch to batch, and this variance in flow can be corrected by the use of the fillers.

The use of the refractory fillers also makes it possible to control the differential thermal analysis characteristics of the base glass.

Because the method of this invention permits lower sealing temperatures to be employed, it can be expected that there will be less glass breakage during sealing operations. Moreover, this invention provides a substantial advantage to television tube manufactures, since several processing steps such as compaction and separate bake out and sealing, among others, and attendant inspection steps can be eliminated.

The fine refractory filler serves an additional purpose in this invention. The firing cycle for sealing the face plate to the funnel portion of a color television tube involves a heatup stage, firing at a peak temperature for a period of time, and a subsequent cool-down stage. It must be remembered from the description of prior art processes that according to past practice, the television tube, with the face plate and funnel previously sealed together, must subsequently be again heated and then evacuated. Quite clearly, it would be very desirable if the heat-up stage required for evacuation of the tube could be effected during the course of the face plate and funnel sealing stage. This has not been possible with conventional solder glasses fireable at 400° C. because the application of a vacuum to a tube while the sealing glass composition is still only in a semi-rigid state increases the activity of the sealing glass composition and induces bubbling in the seal. The use of a fine refractory filler according to this invention has been found to reduce the activity of the sealing glass composition and to avoid inducing bubbling even when a vaccum is applied during the cool-down stage of the firing cycle. For example, when a particularly preferred sealing glass composition of this invention if fired at a temperature of about 400° C., to seal the face plate and funnel components of a color television tube, and the sealing glass composition includes about 18 percent by weight of coarse refractory filler and up to about 2 percent by weight of fine refractory filler, the vacuumization of the interior confines of the tube may be carried out at a temperature of about 370° C. By commencing evacuation of the tube at a temperature of about 370° C. and proceeding until the tube has been cooled enough to be handled, it is possible to achieve the substantially complete evacuation of the tube simultaneously with the face plate and funnel sealing operation, and thus eliminate the necessity of the presently practiced separate re-heat and evacuation step.

Another advantage of the present invention is that by firing the sealing glass composition at a temperature of about 400° C., the resulting seal is in a vitreous state. As a result, during the cool-down stage of the firing cycle, the seal is not rigid as is the situation with crystallized seals presently used. Thus, the creation of severe localized stresses at the face plate-seal-funnel interfaces and the frequency of crack formation is less apt to occur. Thus, it is to be expected that the sealing glasses and methods of this invention will result in fewer rejected television tubes during the manufacturing process.

Four of the individual steps required in prior art processes for the manufacture of color television tubes are:
1. Compaction by heating at an elevated temperature;
2. Baking of the phosphors at an elevated temperature;
3. Sealing the face plate to the funnel portion by firing the sealing glass; and
4. Re-heating and evacuating the interior of the tube.

From the foregoing discussion, it will be apparent that this invention provides a sealing glass composition and method suitable for use at firing temperatures of about 400° C., with the result that the compaction step can be eliminated. Furthermore, this invention makes it possible to combine steps 2, 3 and 4 into a unitary processing step. It can be appreciated, therefore, that the savings to the manufacturer attending the elimination and combination of such processing steps will be substantial. Moreover, appreciable conservation of valuable energy can be expected.

What is claimed is:

1. In a particulate glass composition comprising:
    a. at least about 70 weight percent of a PbO-containing glass frit component having a sealing temperature of between about 350° to about 415° C., and
    b. at least about 10–25 weight percent of at least one coarse particulate refractory filler component having a coefficient of thermal expansion of less than about $65 \times 10^{-7}$ in./in./° C. (0°–300° C.) and a particle size distribution of about:

| % of Particles | Microns |
|---|---|
| 90 | 40–60 |
| 75 | 30–45 |
| 50 | 15–35 |
| 25 | 7–20 |
| 10 | 2–10 |
| 5 | 0.5–3 | the improvement comprising:
    c. at least about 0.25–10 weight percent of at least one fine particulate refractory filler component having a coefficient of thermal expansion of less than about $65 \times 10^{-7}$ in./in./° C. (0°–300° C.) and a particle size distribution of about:

| % of Particles | Microns |
|---|---|
| 90 | 5–10 |
| 75 | 3–8 |
| 50 | 2–4 |
| 25 | 0.8–2.5 |
| 10 | 0.5–2.0 |
| 5 | 0.2–1.5 |

2. In a particulate glass composition according to claim 1, in which component (B) has a particle size distribution of about:

| % of Particles | Microns |
|---|---|
| 90 | 7–9 |
| 75 | 4–6 |
| 50 | 2–4 |
| 25 | 1.2–2.2 |
| 10 | 0.8–1.6 |
| 5 | 0.7–1.3 | and in which component (C) has a particle size distribution of about:

| % of Particles | Microns |
|---|---|
| 90 | 7–9 |
| 75 | 4–6 |
| 50 | 2–4 |
| 25 | 1.2–2.2 |
| 10 | 0.8–1.6 |
| 5 | 0.7–1.3 | and in which each of said refractory filler components has a coefficient of thermal expansion of less than about $40 \times 10^{-7}$ in./in./° C. (0°–300° C.).

3. In a particulate glass composition according to claim 2, in which said PbO-containing glass frit component is a lead-zinc-borate glass.

4. A particulate glass composition comprising:
    A. at least about 75 weight percent of a PbO-containing glass frit component having
        1. a glassy edge of about 315° to about 390° C. as determined in a gradient boat test,
        2. a devitrification edge of about 380° to about 425° C. as determined in a gradient boat test,
        3. a button flow of about 1.050 to about 1.250 inches diameter, and
        4. the inherent property when sealed to a glass reference rod of inducing a rod stress of about 1500 to about 3500 p.s.i. tension in a glass reference rod having essentially the following composition:

| Composition | % By Weight |
|---|---|
| $SiO_2$ | 64.0 |
| $Al_2O_3$ | 3.9 |
| $Na_2O$ | 7.7 |
| $K_2O$ | 9.9 |
| CaO | 3.6 |
| MgO | 1.3 |
| BaO | 7.8 |
| $CeO_2$ | 0.3 |
| $Sb_2O_3$ | 0.45 |
| $F_2$ | 1.0 |
| $Fe_2O_3$ | 0.05 |

(B) about 14 to about 22 weight percent of a zirconium silicate component having a particle size distribution of about:

| % of Particles | Microns |
|---|---|
| 90 | 45–60 |
| 75 | 35–40 |
| 50 | 20–35 |
| 25 | 10–20 |
| 10 | 3–10 |
| 5 | 1–3 | and
    C. about 0.5 to about 4 weight percent of a zirconium silicate component having a particle size distribution of about:

| % of Particles | Microns |
|---|---|
| 90 | 7–9 |
| 75 | 4–6 |
| 50 | 2–4 |
| 25 | 1.2–2.2 |
| 10 | 0.8–1.6 |
| 5 | 0.7–1.3 |

5. A particulate glass composition according to claim 4 in which component (B) has a particle size distribution of about:

| % of Particles | Microns |
| --- | --- |
| 90 | 46–50 |
| 75 | 36–40 |
| 50 | 24–28 |
| 25 | 10–14 |
| 10 | 3–5 |
| 5 | 1–3 |

6. A particulate glass composition according to claim 5 in which said frit component consists essentially of about:

| | Weight Percent |
| --- | --- |
| PbO | 80–86 |
| $B_2O_3$ | 10–15 |
| ZnO | 0–5 |
| $SiO_2$ | 0–3 |
| BaO | 0–3 |

7. A particulate glass composition according to claim 5 in which said composition comprises:
A. about 80 weight percent of a glass frit component consisting essentially of about:

| | Weight Percent |
| --- | --- |
| PbO | 83.7 |
| $B_2O_3$ | 12.5 |
| Zno | 2.8 |
| $SiO_2$ | 0.4 |
| BaO | 0.6 | having a particle size distribution of about:

| % of Particles | Microns |
| --- | --- |
| 90 | 62–78 |
| 75 | 36–46 |
| 50 | 17–23 |
| 25 | 8–10 |
| 10 | 3–5 |
| 5 | 2.5–3.5 |

B. about 18 to about 19 weight percent of a zirconium silicate component having a particle size distribution of about:

| % of Particles | Microns |
| --- | --- |
| 90 | 48 |
| 75 | 39 |
| 50 | 26 |
| 25 | 12 |
| 10 | 4 |
| 5 | 2 | and
C. about 2 to about 1 weight percent of a zirconium silicate component having a particle size distribution of about:

| % of Particles | Microns |
| --- | --- |
| 90 | 8 |
| 75 | 5 |
| 50 | 3 |
| 25 | 2 |
| 10 | 1 |
| 5 | 1 |

8. In a sealing glass paste comprising at least about 70 weight percent of a PbO-containing glass frit component having a sealing temperature of about 350° C. to about 415° C., at least about 10–25 weight percent of at least one coarse particulate refractory filler component having a coefficient of thermal expansion of less than about $65 \times 10^{-7}$ in./in./° C. (0°–300° C.) and a particle size distribution of about:

| % of Particles | Microns |
| --- | --- |
| 90 | 40–60 |
| 75 | 30–45 |
| 50 | 15–35 |
| 25 | 7–20 |
| 10 | 2–10 |
| 5 | 0.5–3 | a binder selected from the group consisting essentially of nitrocellulose, hydroxypropyl cellulose and mixtures thereof, and a solvent for said binder, the improvement comprising the inclusion in said sealing glass paste of at least about 0.25–10 weight percent of at least one fine particulate refractory filler component having a coefficient of thermal expansion of less than about $65 \times 10^{-7}$ in./in./° C. (0°–300° C.) and a particle size distribution of about:

| % of Particles | Microns |
| --- | --- |
| 90 | 5–10 |
| 75 | 3–8 |
| 50 | 2–4 |
| 25 | 0.8–2.5 |
| 10 | 0.5–2.0 |
| 5 | 0.2–1.5 |

9. In a sealing glass composition for sealing a faceplate to a funnel portion of a television tube comprising:
a. at least about 70 weight percent of a PbO containing glass frit component having a sealing temperature of about 350° to about 415° C.,
b. at least about 10–25 weight percent of at least one course particulate refractory filler component having a coefficient of thermal expansion of less than about $65 \times 10^{-7}$ in./in./° C. (0°–300° C.) and a particle size distribution of about:

| % of Particles | Microns |
| --- | --- |
| 90 | 40–60 |
| 75 | 30–45 |
| 50 | 15–35 |
| 25 | 7–20 |
| 10 | 2–10 |
| 5 | 0.5–3 | and c. at least one additive in an amount sufficient to prevent the PbO in said glass frit from being chemically reduced upon exposure of said glass frit to reducing conditions at the sealing temperature thereof, the improvement comprising the inclusion in said sealing glass composition of:

d. at least about 0.25–10 weight percent of at least one fine particulate refractory filler component having a coefficient of thermal expansion of less than about $65 \times 10^{-7}$ in./in./° C. (0°–300° C.) and a particle size distribution of about:

| % of Particles | Microns |
|---|---|
| 90 | 5–10 |
| 75 | 3–8 |
| 50 | 2–4 |
| 25 | 0.8–2.5 |
| 10 | 0.5–2.0 |
| 5 | 0.2–1.5 |

10. In a sealing glass composition according to claim 9, in which component (B) has a particle size distribution of about:

| % of Particles | Microns |
|---|---|
| 90 | = 45–60 |
| 75 | = 35–45 |
| 50 | = 20–35 |
| 25 | = 10–20 |
| 10 | = 3–10 |
| 5 | = 1–3 | and component (D) has a particle size distribution of about:

| % of Particles | Microns |
|---|---|
| 90 | = 7–9 |
| 75 | = 4–6 |
| 50 | = 2–4 |
| 25 | = 1.2–2.2 |
| 10 | = 0.8–1.6 |
| 5 | = 0.7–1.3 | and each of said refractory filler components has a coefficient of thermal expansion of less than about $40 \times 10^{-7}$ in./in./° C. (0°–300° C.).

11. In a sealing glass composition according to claim 10, in which said PbO-containing glass frit component has:
  a. a glassy edge of about 315° C. to about 390° C. as determined in a gradient boat test,
  b. a devitrification edge of about 380° C. to about 425° C. as determined in a gradient boat test,
  c. a button flow of about 1.050 to about 1.250 inches diameter, and
  d. the inherent property when sealed to a glass reference rod of inducing a rod stress of about 1500 to about 3500 p.s.i. tension in a glass reference rod having essentially the following composition:

| Composition | % By Weight |
|---|---|
| $SiO_2$ | 64.0 |
| $Al_2O_3$ | 3.9 |
| $Na_2O$ | 7.7 |
| $K_2O$ | 9.9 |
| CaO | 3.6 |
| MgO | 1.3 |
| BaO | 7.8 |
| $CeO_2$ | 0.3 |
| $Sb_2O_3$ | 0.45 |
| $F_2$ | 1.0 |
| $Fe_2O_3$ | 0.05 |

12. In a sealing glass composition according to claim 11 in which said frit component is a lead-zinc-borate glass frit.

13. In a sealing glass composition for sealing a face plate to a funnel portion of a television tube comprising:
  A. at least about 75 weight percent of a PbO-containing glass frit component having
    1. a glassy edge of about 315° to about 390° C. in a gradient boat test,
    2. a devitrification edge of about 380° C. to about 425° C. in a gradient boat test, and
    3. a button flow of about 1.050 to about 1.250 inches diameter;
  B. about 14 to about 22 weight percent of zirconium silicate component having a particle size distribution of about:

| % of Particles | Microns |
|---|---|
| 90 | 45–60 |
| 75 | 35–40 |
| 50 | 20–35 |
| 25 | 10–20 |
| 10 | 3–10 |
| 5 | 1–3 |

C. $Bi(NO_3)_3 \cdot 5H_2O$ in an amount sufficient to prevent PbO in said frit from being chemically reduced when said solder glass is being fired in the presence of reducing conditions at a temperature sufficient to seal said face plate to said funnel portion; the improvement comprising the inclusion in said sealing glass composition of:
  D. about 0.5 to about 4 weight percent of zirconium silicate component having a particle size distribution of about:

| % of Particles | Microns |
|---|---|
| 90 | 7–9 |
| 75 | 4–6 |
| 50 | 2–4 |
| 25 | 1.2–2.2 |
| 10 | 0.8–1.6 |
| 5 | 0.7–1.3 |

14. In a sealing glass composition according to claim 13 in which component (B) has a particle size distribution of about:

| % of Particles | Microns |
|---|---|
| 90 | 46–50 |
| 75 | 36–40 |
| 50 | 24–28 |
| 25 | 10–14 |
| 10 | 3–5 |

| % of Particles | Microns |
|---|---|
| 5 | 1–3 |

15. In a sealing glass composition according to claim 13 in which said frit component consists essentially of about:

|  | Weight Percent |
|---|---|
| PbO | 80–86 |
| B$_2$O$_3$ | 10–15 |
| ZnO | 0–5 |
| SiO$_2$ | 0–3 |
| BaO | 0–3 |

16. In a sealing glass composition according to claim 13 in which said composition comprises:
A. about 79.92 to about 79.7 weight percent of a frit component consisting essentially of about:

|  | Weight Percent |
|---|---|
| PbO | 83.7 |
| B$_2$O$_3$ | 12.5 |
| Zno | 2.8 |
| SiO$_2$ | 0.4 |
| BaO | 0.6 | and having a particle size distribution of about:

| % of Particles | Microns |
|---|---|
| 90 | 62–78 |
| 75 | 36–46 |
| 50 | 17–23 |
| 25 | 8–10 |
| 10 | 3–5 |
| 5 | 2.5–3.5 |

B. about 18 to about 19 weight percent of a coarse zirconium silicate component having a particle size distribution of about:

| % of Particles | Microns |
|---|---|
| 90 | 48 |
| 75 | 39 |
| 50 | 26 |
| 25 | 12 |
| 10 | 4 |
| 5 | 2 |

C. about 2 to about 1 weight percent of a fine zirconium silicate component having a particle size distribution of about:

| % of Particles | Microns |
|---|---|
| 90 | 8 |
| 75 | 5 |
| 50 | 3 |
| 25 | 2 |
| 10 | 1 |
| 5 | 1 | and
D. about 0.08 to about 0.3 weight percent of Bi(NO$_3$)$_3$·5H$_2$O.

17. A sealing glass paste comprising:
A. a sealing glass composition according to claim 9.
B. a binder selected from the group consisting of nitrocellulose, hydroxypropyl cellulose and mixtures thereof; and
C. a solvent for said binder.

18. A sealing glass paste according to claim 17 wherein said binder comprises a mixture of hydroxypropyl cellulose and nitrocellulose, said hydroxypropyl cellulose being present in an amount sufficient to impart stability to said paste.

19. A sealing glass paste according to claim 18 in which said solvent is selected from the group consisting of amyl acetate, ethylene glycol methyl ether, ethylene gycol ethyl ether, methyl amyl acetate, ethyl hexyl acetate, n-butyl acetate, isobutyl acetate, sec. butyl acetate and diethylene glycol monobutyl ether acetates.

20. A sealing glass paste according to claim 18 wherein said hydroxypropyl cellulose has an average molecular weight of from between about 40,000 and about 300,000.

21. A sealing glass paste according to claim 20 wherein said solvent is amyl acetate.

22. A sealing glass paste according to claim 20 in which said solvent is ethylene glycol methyl ether.

23. A sealing glass paste according to claim 18 in which said binder consists essentially of nitrocellulose and a hydroxypropyl cellulose having a molecular weight of about 40,000 to about 300,000, and said solvent comprises amyl acetate in admixture with ethylene glycol methyl ether.

24. A sealing glass paste according to claim 23 in which said hydroxypropyl cellulose has an average molecular weight of about 60,000.

25. A sealing glass paste according to claim 23 which comprises about 5 to 30% by weight of a 4-weight percent solution of hydroxypropyl cellulose in equal parts by weight of amyl acetate and ethylene glycol methyl ether, and about 95 to 70% by weight of a 1 to 6.2 weight percent solution of nitrocellulose in amyl acetate.

26. A sealing glass paste comprising:
A. a sealing glass composition according to claim 13,
B. a binder selected from the group consisting of nitrocellulose, hydroxypropyl cellulose and mixtures thereof, and
C. a solvent for said binder.

27. A sealing glass paste comprising:
A. a sealing glass composition according to claim 16,
B. a binder selected from the group consisting of nitrocellulose, hydroxypropyl cellulose and mixtures thereof, and
C. a solvent for said binder.

* * * * *

UNITED STATES PATENT AND TRADEMARK OFFICE
CERTIFICATE OF CORRECTION

PATENT NO. : 4,006,028
DATED : February 01, 1977
INVENTOR(S) : Neil B. Nofziger

It is certified that error appears in the above-identified patent and that said Letters Patent are hereby corrected as shown below:

Claim 2, column 21 - Micron column, first occurrence, should read ---45-60; 35-45; 20-35; 10-20; 3-10; and 1-3---.

Signed and Sealed this

Twenty-fourth Day of May 1977

[SEAL]

Attest:

RUTH C. MASON
*Attesting Officer*

C. MARSHALL DANN
*Commissioner of Patents and Trademarks*